US011525790B2

(12) United States Patent
Ito

(10) Patent No.: US 11,525,790 B2
(45) Date of Patent: Dec. 13, 2022

(54) SAMPLE HOLDING DEVICE FOR X-RAY ANALYSIS

(71) Applicant: RIGAKU CORPORATION, Akishima (JP)

(72) Inventor: Koichiro Ito, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 196 days.

(21) Appl. No.: 16/992,670

(22) Filed: Aug. 13, 2020

(65) Prior Publication Data

US 2021/0048398 A1 Feb. 18, 2021

(30) Foreign Application Priority Data

Aug. 16, 2019 (JP) .............................. JP2019-149383

(51) Int. Cl.
*G01N 23/20025* (2018.01)
*G01N 23/207* (2018.01)
*G01N 23/2204* (2018.01)

(52) U.S. Cl.
CPC ..... *G01N 23/20025* (2013.01); *G01N 23/207* (2013.01); *G01N 23/2204* (2013.01); *G01N 2223/056* (2013.01); *G01N 2223/1016* (2013.01); *G01N 2223/309* (2013.01)

(58) Field of Classification Search
None
See application file for complete search history.

(56) References Cited

U.S. PATENT DOCUMENTS

| 3,409,769 | A | | 11/1968 | McKinney et al. |
| 3,478,207 | A | | 11/1969 | Goerke et al. |
| 3,973,120 | A | | 8/1976 | Kessels |
| 4,409,854 | A | * | 10/1983 | Solazzi ............ G01N 23/20025 |
| | | | | 422/547 |
| 5,181,233 | A | | 1/1993 | Rink et al. |
| 2003/0095634 | A1 | | 5/2003 | Dosho |
| 2009/0045349 | A1 | * | 2/2009 | Sprinzak ............ G01N 23/2204 |
| | | | | 250/441.11 |
| 2021/0048398 | A1 | * | 2/2021 | Ito ..................... G01N 23/20025 |
| 2021/0080410 | A1 | * | 3/2021 | Vukotic ................. B32B 27/281 |
| 2021/0102874 | A1 | * | 4/2021 | Xue .......................... G01N 1/36 |

FOREIGN PATENT DOCUMENTS

| JP | 11-6805 A | 1/1999 |
| JP | H11-132977 A | 5/1999 |
| JP | 2000-036272 A | 2/2000 |

(Continued)

OTHER PUBLICATIONS

Extended European Search Report dated Mar. 4, 2021, issued in counterpart EP application No. 20190798.7 (12 pages).

(Continued)

*Primary Examiner* — Thomas R Artman
(74) *Attorney, Agent, or Firm* — WHDA, LLP

(57) ABSTRACT

A sample holder (10) filled with a sample is held in a base member (20), and an airtight member (30) is mounted on the base member (20) so as to cover the surroundings of the sample holder (10), thereby forming a sample holding structure in a closed space. The airtight member (30) includes a fitting portion (35) which is configured to be fitted and mounted in a mounting portion (21).

6 Claims, 12 Drawing Sheets

(56) References Cited

FOREIGN PATENT DOCUMENTS

| JP | 2001-083105 A | 3/2001 |
| JP | 2010-067468 A | 3/2010 |
| JP | 2011-043417 A | 3/2011 |
| JP | 2011-237292 A | 11/2011 |
| WO | 99/15886 A1 | 4/1999 |
| WO | 2006/021961 A2 | 3/2006 |
| WO | 2006/021961 A3 | 8/2006 |
| WO | 2015/194465 A1 | 12/2015 |

OTHER PUBLICATIONS

Ritter, "An Hermetically Sealed Inert Atmosphere Cell for X-Ray Powder Diffraction", Powder Diffraction, JCPDS-International Centre for Diffraction Data, Wsarthmore US, vol. 3, No. 1, Mar. 1988, cited in EP Extended European Search Report dated Mar. 4, 2021, pp. 30-31. (2 pages).

Rodriguez et al., "A Beryllium Dome Specimen Holder for XRD Analysis of Air Sensitive Materials", Powder Diffraction, vol. 23, No. 2, Jun. 2008, cited in EP Extended European Search Report dated Mar. 4, 2021, pp. 121-124. (6 pages).

Office Action dated Jun. 27, 2022, issued in counterpart JP Application No. 2019-149383, with English Translation. (11 pages).

\* cited by examiner

DATA IMMEDIATELY AFTER

DATA AFTER ONE DAY HAS ELAPSED

SUPERIMPOSED DATA

SAMPLE HOLDING DEVICE FOR X-RAY ANALYSIS

FIELD OF THE INVENTION

The present invention relates to a sample holding device for X-ray analysis used for setting a sample in an X-ray analysis apparatus, and particularly, a sample holding device for X-ray analysis having a function of enabling a sample to be transported and set in an X-ray analysis apparatus while the sample is placed in a closed space.

BACKGROUND OF THE INVENTION

In various X-ray analysis apparatuses such as an X-ray diffraction apparatus, an X-ray reflectivity measurement apparatus, an X-ray small angle scattering apparatus, and a fluorescent X-ray analysis apparatus, a sample is set by using an instrument which is generally called a sample holder, and measurement analysis using X-rays is performed in the atmosphere. However, when an anaerobic substance that easily chemically reacts with atmospheric components (oxygen, nitrogen, water, etc.) is used as a sample, it is necessary to perform measurement analysis while placing the sample in a closed space that does not come into contact with the atmosphere.

Japanese Patent Laid-Open No. 11-6805 (Hereinafter referred to as "Patent Document 1") discloses an airtight sample holder for an X-ray apparatus that is configured to be suitable for such an application. In other words, the airtight sample holder for an X-ray apparatus disclosed in Patent Document 1 has a configuration in which a sample is filled in a sample filling portion (3a) of a sample table (3), a film (4) and a packing material (5) are sequentially mounted on the sample table (3) after the surface of the sample is flattened with a spatula or the like, the film (4) and the packing material (5) are pressed by a pressing tool to be closely attached to the sample table (3), and then these components are fixed to the sample table (3) by male screws (7). Note that the reference signs in parentheses are assigned to the respective components in Patent Document 1.

In the above-mentioned prior art, the film and the packing material are fixed to the sample table by using the male screws, and thus a tool such as a screwdriver is required for fastening the male screws. The above-described series of operations for holding the sample in the airtight sample holder for the X-ray apparatus are usually performed by filling an inert gas in a sealed container called a glove box in advance, and handing each component of the airtight sample holder for the X-ray apparatus arranged in the glove box from the outside through rubber gloves by an operator. At that time, it is difficult to perform a fine operation such as a fastening operation of male screws using a tool from the outside through rubber gloves, which has been a factor of significantly lowering work efficiency.

SUMMARY OF THE INVENTION

The present invention has been made in view of such circumstances, and has an object to provide a sample holding device for X-ray analysis that can be easily handled, and can form, by a simple operation, a state in which a sample is arranged in a closed space.

In order to attain the above object, a sample holding device for X-ray analysis according to the present invention comprises a sample holder having a sample filling portion for filling a sample, a base member for holding the sample holder, and an airtight member configured to be freely detachably mounted on the base member so as to cover surroundings of the sample holder held by the base member.

The base member has a mounting portion for mounting the airtight member thereon, and the airtight member has a fitting portion configured to be fitted and mounted in the mounting portion. Further, a locking mechanism is provided to the mounting portion and the fitting portion so as to prevent the airtight member from coming off the base member through engagement in a step of fitting the fitting portion into the mounting portion.

In the thus-configured sample holding device for X-ray analysis according to the present invention, the surroundings of the sample filled in the sample filling portion can be made a closed space only by fitting the fitting portion of the airtight member into the mounting portion of the base member. Therefore, according to the sample holding device for X-ray analysis of the present invention, it is possible to easily handle the sample holding device for X-ray analysis and form a state in which the sample is arranged in the closed space by a simple operation.

In addition, since the locking mechanism acts in the step of performing the fitting operation to prevent the airtight member from coming off the base member, there is little risk that atmospheric air flows into the hollow portion of the airtight member during transportation, and the surroundings of the sample can be stably kept in an airtight state.

The airtight member includes a block-shaped main body portion having a hollow portion therein, and the fitting portion formed so as to protrude from a lower surface of the main body portion, and is configured so that a lower end surface of the fitting portion is opened and communicates with the hollow portion in the main body portion, an X-ray transmission window is formed by cutting out the main body portion, and an X-ray window material is formed around the X-ray transmission window so as to cover the X-ray transmission window. Further, an operating portion for enabling an operator to perform a fitting operation while gripping the operating portion may be formed in a surface region of the main body portion where the X-ray transmission window is not formed.

The X-ray window material is preferably formed of any one of metal, artificial mineral and polymer.

The base member includes a holding groove configured to freely detachably hold the sample holder, the sample holder includes a fitting convex portion configured to be fitted and held in the holding groove, the sample filling portion of the sample holder is formed by a recessed groove, an opening surface of the recessed groove is formed in a rectangular shape, and there is provided a configuration in which a long side or short side of a rectangular shape on the opening surface of the recessed groove is arranged in a direction perpendicular to an optical axis of incident X-rays by changing an orientation of the fitting convex portion of the sample holder around a central axis by 90° with respect to the holding groove of the baes member and fitting the fitting convex portion into the holding groove of the base member.

According to such a configuration, for example, in X-ray analysis such as an X-ray diffraction measurement to be performed while X-rays are made incident to the sample surface at a low angle, the short side of the opening surface in the recessed groove (sample filling portion) is arranged in a direction perpendicular to the optical axis of the incident X-rays (in other words, the long side of the opening surface is arranged in parallel with the optical axis of the incident X-rays), which makes it possible to secure a wide X-ray irradiation area in the direction of the optical axis of the incident X-rays for the sample surface.

Further, in X-ray analysis such as an X-ray diffraction measurement to be performed while X-rays are incident to the sample surface at a normal angle, the long side of the opening surface in the recessed groove (sample filling portion) is arranged in a direction perpendicular to the optical axis of the incident X-rays, which makes it possible to secure a long X-ray irradiation region in the width direction for the sample surface, and high-intensity X-ray irradiation can be performed.

An upper surface of the base member is arranged at the same height position as an X-ray irradiation position in an X-ray analysis apparatus when the sample holding device for X-ray analysis is mounted in the X-ray analysis apparatus. An opening surface of the recessed groove is preferably positioned so as to be flush with an upper surface of the base member when the sample holder is held by the base member.

According to this configuration, even when the sample holder is replaced, the opening surface of the recessed groove formed in the sample holder is positioned to be flush with the upper surface of the base member by merely appropriately fitting the fitting convex portion of the sample holder into the holding groove of the base member. Further, the surface (sample surface) of the sample filled in the recessed groove is aligned with the opening surface of this recessed groove, whereby the sample surface is arranged to be flush with the upper surface of the base member. In X-ray analysis, it is necessary to place this sample surface at the X-ray irradiation position set in the X-ray analysis apparatus.

The upper surface of the base member serves as a reference surface when the sample is irradiated with X-rays, and when the base member is attached to the X-ray analysis apparatus, the reference surface is positioned at the same height as the X-ray irradiation position. At this time, since the sample surface is also arranged at the same height position as the X-ray irradiation position, it is easy to position (particularly, position in the height direction) the sample surface with respect to the X-ray irradiation position.

The airtight member may be configured to include a knife edge in the hollow portion of the main body portion, the knife edge hanging downward from a ceiling surface and shielding scattered X-rays incident through the X-ray transmission window.

By providing the knife edge in the hollow portion of the airtight member, scattered X-rays generated when incident X-rays are transmitted through the X-ray window material stretched over the X-ray transmission window can be effectively shielded by the knife edge. Therefore, it is possible to reduce noise of the X-ray measurement data that appears due to incidence of the scattered X-rays to the sample and perform highly accurate measurement analysis.

Note that the mounting portion of the base member may be formed by a concave portion or a convex portion, and the fitting portion of the airtight member may be formed in a tubular shape that allows the fitting portion to be fitted into the mounting portion. Further, the locking mechanism may be provided to each fitting surface of the mounting portion and the fitting portion.

As described above, according to the sample holding device for X-ray analysis of the present invention, the sample holding device for X-ray analysis can be easily handled, and it is possible to form a state in which the sample is placed in a closed space by a simple operation.

DETAILED DESCRIPTION OF EMBODIMENTS

Embodiments of the present invention will be described in detail below with reference to the drawings.

Figure 1:
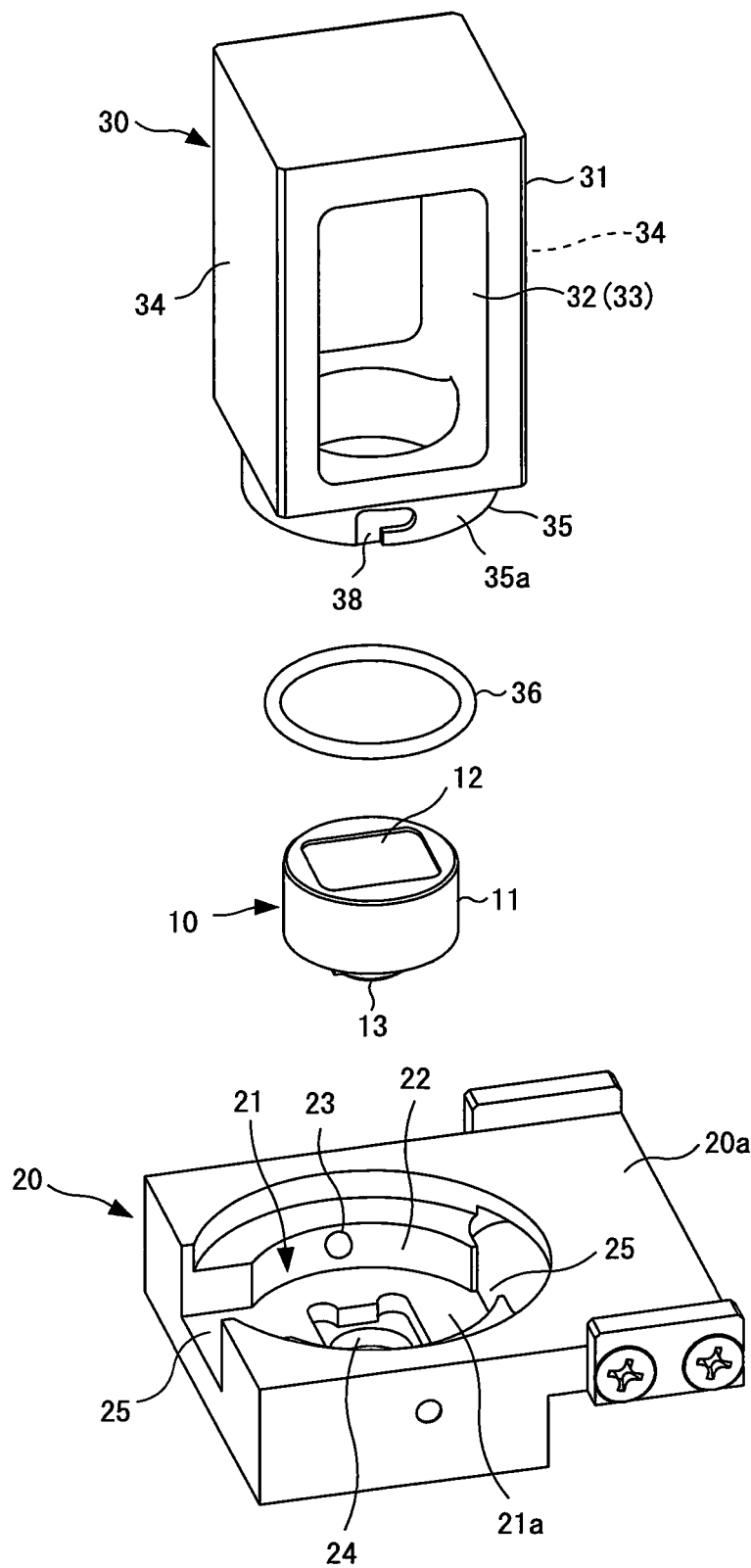
FIG. 1 is an exploded perspective view of a sample holding device for X-ray analysis according to an embodiment of the present invention.
Figure 2:
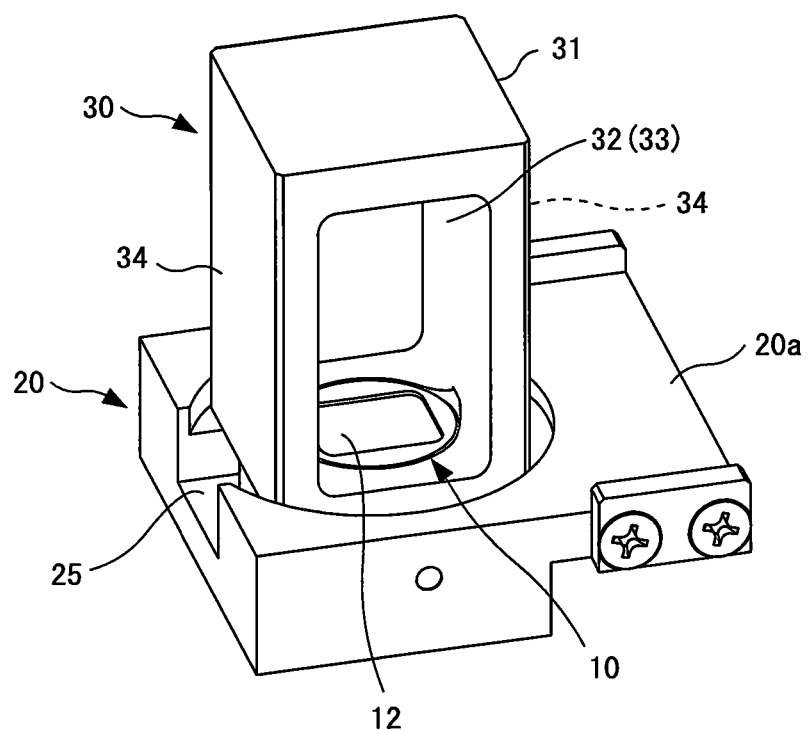
FIG. 2 is a perspective view showing an external appearance of the sample holding device for X-ray analysis according to the embodiment of the present invention.

FIG. 1 is an exploded perspective view of a sample holding device for X-ray analysis according to an embodiment of the present invention, and FIG. 2 is a perspective view showing an external appearance of the sample holding device for X-ray analysis.

The sample holding device for X-ray analysis according to the present embodiment includes components such as a sample holder 10, a base member 20, and an airtight member 30 as shown in FIG. 1. The sample holder 10 filled with a sample is held in the base member 20, and the airtight member 30 is mounted on the base member 20 so as to cover the surroundings of the sample holder 10, thereby forming a sample holding structure in a closed space as shown in FIG. 2.

FIG. 3A to FIG. 3F are diagrams showing the sample holder.

As shown in these figures, the sample holder 10 includes a holder body 11 formed in a cylindrical shape, and a sample filling portion 12 formed on the upper surface of the holder body 11, and a sample as an analysis target is filled in the sample filling portion 12.

The holder body 11 may be made of, for example, a metal material such as aluminum alloy or stainless steel, or a non-metal material such as glass. However, when a material forming the holder body 11 is selected, it is preferable to avoid such a material that chemically reacts with a sample to be filled or a material that emits diffracted X-rays under diffraction conditions similar to those of the sample. Further, the holder body 11 may also be formed using a material (X-ray non-reflecting material) obtained by cutting out a silicon single crystal in a direction that does not satisfy the X-ray diffraction condition. By using such an X-ray non-reflecting material, it is possible to suppress noise from being mixed with X-ray measurement data, for example.

In this embodiment, the sample filling portion 12 is formed by a recessed groove 12 having a shallow depth. It is preferable that the surface (sample surface) of the sample filled in the recessed groove 12 is rubbed and smoothed by using a spatula or the like so that the sample surface is flush with an opening surface of the recessed groove 12. However, the shape of the sample filling portion 12 is not limited to the shape of the shallow recessed groove.

Figure 3A:
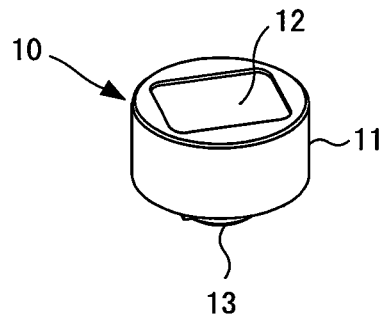
FIG. 3A is a perspective view of a sample holder as seen obliquely from above.
Figure 3B:
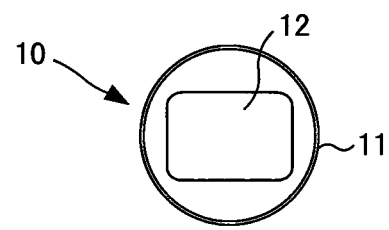
FIG. 3B is a plan view of the sample holder.
Figure 3C:
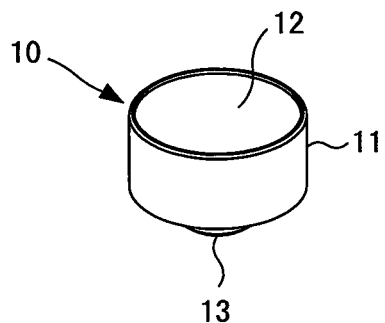
FIG. 3C is a perspective view of another sample holder as seen obliquely from above.
Figure 3D:
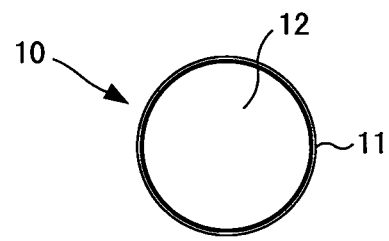
FIG. 3D is a plan view of another sample holder.

The opening surface of the recessed groove (sample filling portion) 12 may be formed into various shapes. For example, the opening surface of the recessed groove 12 may be formed in a rectangular shape as shown in FIGS. 3A and 3B or a circular shape as shown in FIGS. 3C and 3D.

With respect to the sample holder 10, it is preferable that plural types of sample holders obtained by arbitrarily combining various materials and various shapes of the opening surface of the recessed groove 12 as described above are prepared in advance, and appropriately selected and used according to the sample as an analysis target and the content of X-ray analysis.

Figure 3E:
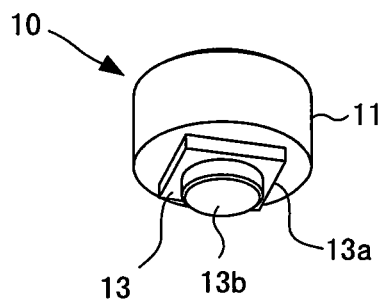
FIG. 3E is a perspective view of the sample holder as seen obliquely from below.
Figure 3F:
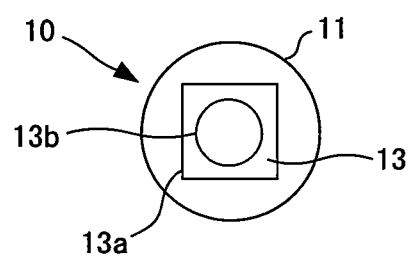
FIG. 3F is a bottom view of the sample holder.

As shown in FIGS. 3E and 3F, the sample holder 10 is formed so that a fitting convex portion 13 protrudes downward from the center portion of the bottom surface of the holder body 11. The fitting convex portion 13 is configured to have a base portion which is in contact with the bottom surface of the holder body 11 and forms a square convex portion 13a having a square cross-section, and a cylindrical core portion 13b which protrudes from the center portion of the bottom surface of the fitting convex portion 13.

As described above, even in the case of preparing plural types of sample holders 10 which are different in the material and the shape of the opening surface of the recessed groove 12, it is preferable that the shapes of the fitting convex portions 13 of these sample holders 10 are commonly compatible with the base member 20.

Figure 4A:
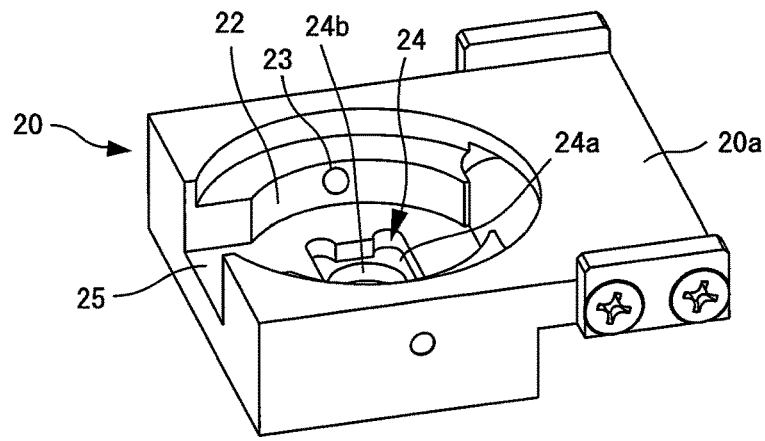
FIG. 4A is a perspective view showing a base member.
Figure 4B:
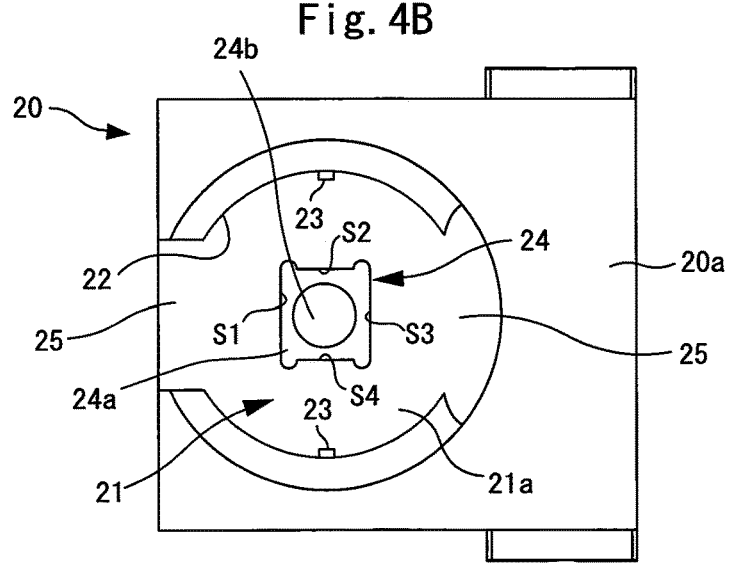
FIG. 4B is a plan view showing the base member.
Figure 4C:
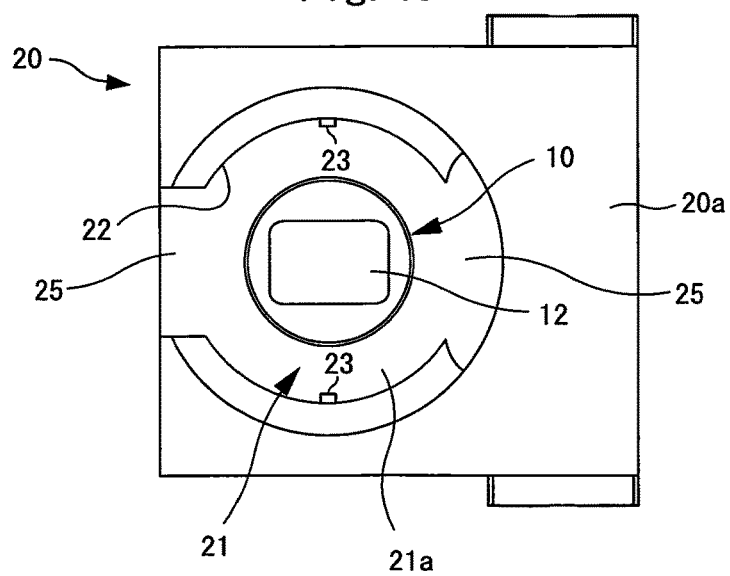
FIG. 4C is a plan view showing a state where the sample holder is mounted on the base member.

FIGS. 4A to 4C are diagrams showing the base member.

The base member 20 can be made of, for example, a metal material such as an aluminum alloy or stainless steel. The base member 20 has a stepped concave portion which is dug down from the upper surface of the base member 20 and has a circular cross-section. A part of the stepped concave portion constitutes a mounting portion 21 for mounting the airtight member 30 thereon. In other words, the inner bottom surface of the stepped concave portion is processed into a flat surface, and this inner bottom surface constitutes a bottom surface 21a of the mounting portion 21. Further, an inner peripheral surface extending from the inner bottom surface to an intermediate step portion constitutes a fitting surface 22 that is fitted to a fitting portion 35 of the airtight member 30 described later. Lock pins 23 are provided at an intermediate portion of the fitting surface 22 so as to protrude radially inward (that is, toward a central axis inside the stepped concave portion).

A holding groove 24 is further dug down from a center portion of the inner bottom surface formed in the base member 20 so as to be formed on the inner bottom surface of the stepped concave portion. By fitting the above-mentioned fitting convex portion 13 of the sample holder 10 into the holding groove 24, the sample holder 10 is held by the base member 20 without backlash. Note that the holding groove 24 is configured so that the fitting convex portion 13 can be freely detachably fitted into the holding groove 24. As a result, it is possible to appropriately exchange plural types of sample holders 10 with one another and hold each sample holder 10 in the base member 20.

The holding groove 24 is also formed in a stepped shape, and has an upper region 24a extending from an opening surface at the upper end of the holding groove 24 to an intermediate step portion, and a lower region 24b extending from the intermediate step portion to an inner bottom surface of the holding groove 24. The square convex portion 13a formed in the fitting convex portion 13 of the sample holder 10 is fitted in the upper region 24a, and the core portion 13b formed in the fitting convex portion 13 of the sample holder 10 is fitted in the lower region 24b. The lower region 24b of the holding groove 24 is formed to have a circular cross-section corresponding to the cylindrical shape of the core portion 13b of the fitting convex portion 13, and the core portion 13b of the fitting convex portion 13 is fitted to the inner peripheral surface of the lower region 24b of the holding groove 24.

Further, as shown in FIG. 4A, the upper region 24a of the holding groove 24 has four side surfaces S1, S2, S3, and S4 on the inner wall thereof, and the side surfaces S1, S2, S3 and S4 are in contact with the respective sides of the square convex portion 13a formed in the fitting convex portion 13 of the sample holder 10. As a result, the square convex portion 13a formed in the fitting convex portion 13 of the sample holder 10 is allowed to be fitted in the upper region 24a of the holding groove 24 while changing the orientation of the square convex portion 13a by 90° around the central axis thereof.

The base member 20 holding the sample holder 10 is attached to an X-ray analysis apparatus 200 as described later, and the sample filled in the recessed groove 12 of the sample holder 10 is irradiated with X-rays.

Here, as shown in FIGS. 3A and 3B, the sample holder 10 in which the opening surface of the recessed groove 12 is formed in a rectangular shape is configured so that when the square convex portion 13a of the fitting convex portion 13 is fitted in the upper region 24a of the holding groove 24 in the base member 20, the long sides or the short sides of the opening surface of the recessed groove 12 are arranged in a direction orthogonal to the optical axis of incident X-rays.

Figure 5A:
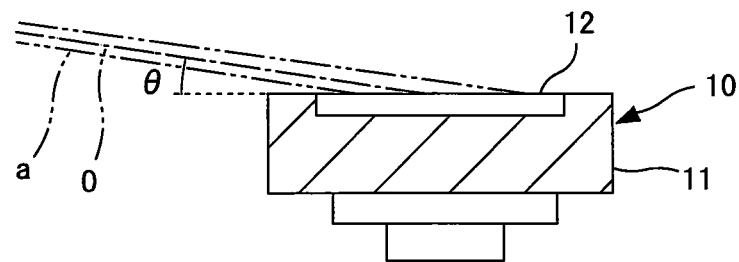
FIG. 5A is a front sectional view showing a state where a sample surface of a sample filled in a sample holder is irradiated with X-rays from a low angle.
Figure 5B:
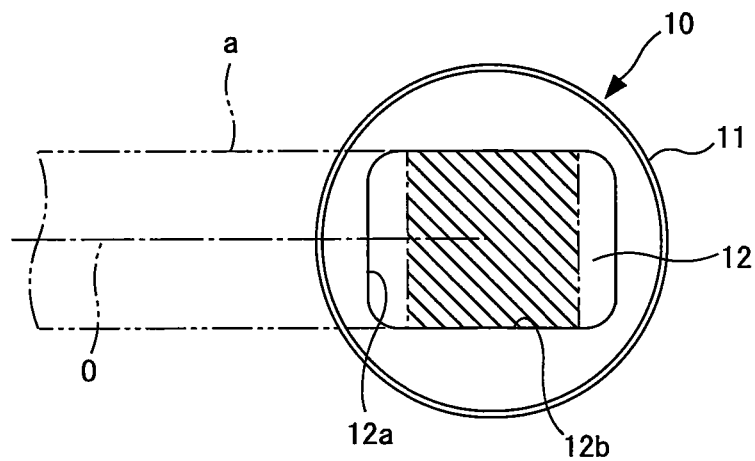
FIG. 5B is a plan view of the same.
Figure 5C:
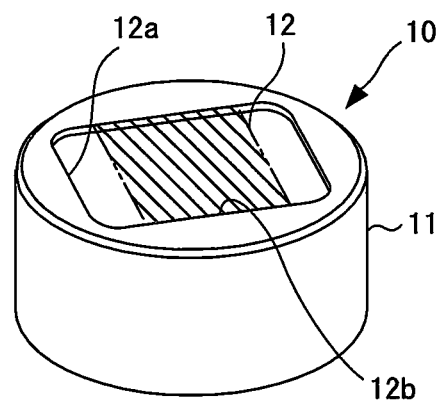
FIG. 5C is a perspective view of the same.

For example, when the X-ray incident angle to the sample surface is set to a low angle (for example, θ is set to 1° or less for 2θ scan in which the incident angle θ is fixed, and a θ start angle is set near 2° for θ/2θ scan in which the incident angle is not fixed) in an X-ray diffraction measurement, the short sides 12a of the opening surface of the recessed groove 12 are arranged to be orthogonal to the optical axis O of incident X-rays a (in other words, the long sides 12b of the opening surface are arranged in parallel to the optical axis O of the incident X-rays a) as shown in FIGS. 5A to 5C, whereby it is possible to secure an X-ray irradiation area which is broad in the direction of the optical axis O of the incident X-rays a with respect to the sample surface.

Figure 6A:
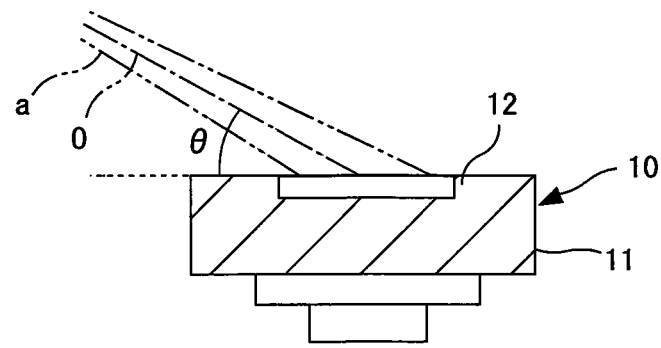
FIG. 6A is a front sectional view showing a state where the sample surface of the sample filled in the sample holder is irradiated with X-rays from a normal angle.
Figure 6B:
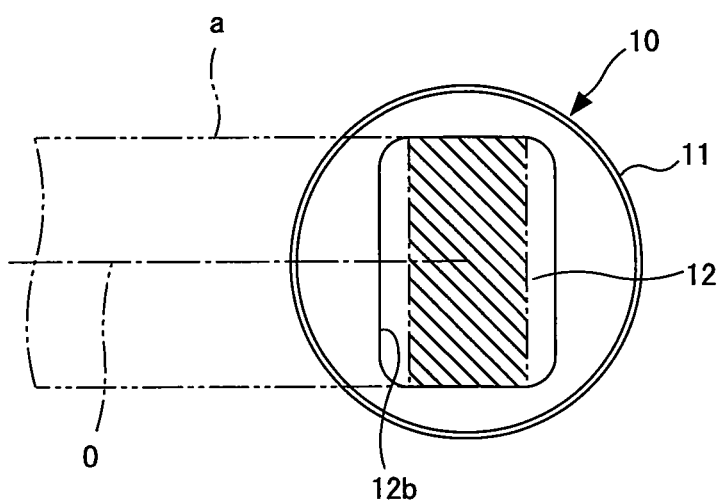
FIG. 6B is a plan view of the same.
Figure 6C:
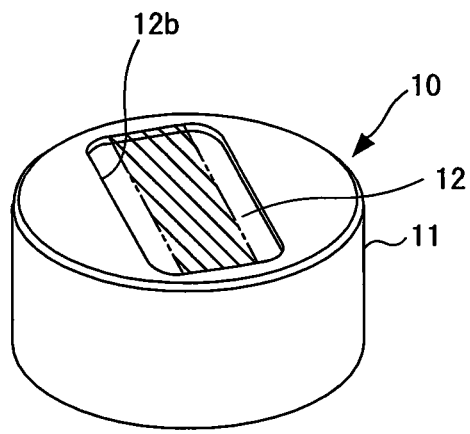
FIG. 6C is a perspective view of the same.

Further, when the X-ray incident angle to the sample surface is set to a normal angle in the X-ray diffraction measurement, the long sides 12b of the opening surface of the recessed groove 12 are arranged to be orthogonal to the optical axis O of the incident X-rays a as shown in FIGS. 6A to 6C, whereby it is possible to secure an X-ray irradiation region which is long in the width direction with respect to the sample surface, thereby realizing high-intensity X-ray irradiation.

Returning to FIG. 4C, two cutout portions 25 which communicate with the stepped concave portion constituting the mounting portion 21 are formed at two opposing locations of the side wall of the base member 20. These cutout portions 25 form a sweep-out portion that opens the bottom surface 21a of the mounting portion 21 from the side surface of the base member 20 to the outside, whereby a sample, etc. spilling onto the bottom surface 21a of the mounting portion 21 when the sample is filled into the sample holder 10 held in the base member 20 can be easily swept out through the cutout portions 25 to the outside.

FIGS. 7A to 7D are diagrams showing the airtight member.

The airtight member 30 includes a box-shaped block type main body portion 31 having a hollow portion therein, and a fitting portion 35 protruding outward from the lower surface of the main body portion 31.

Figure 7A:
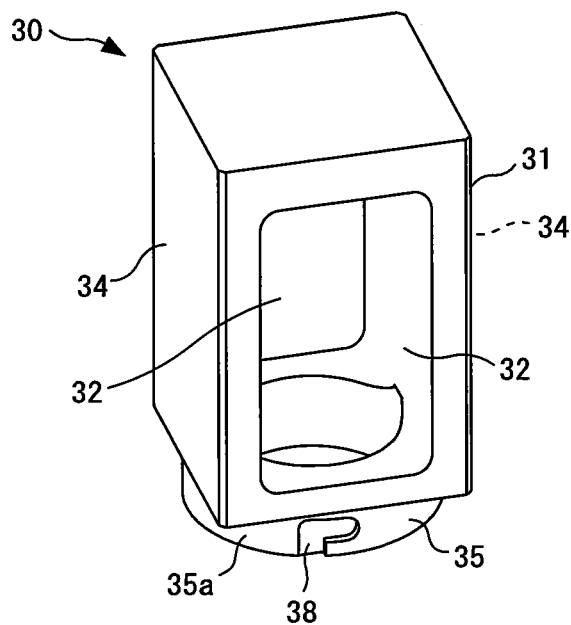
FIG. 7A is a perspective view showing an airtight member.
Figure 7B:
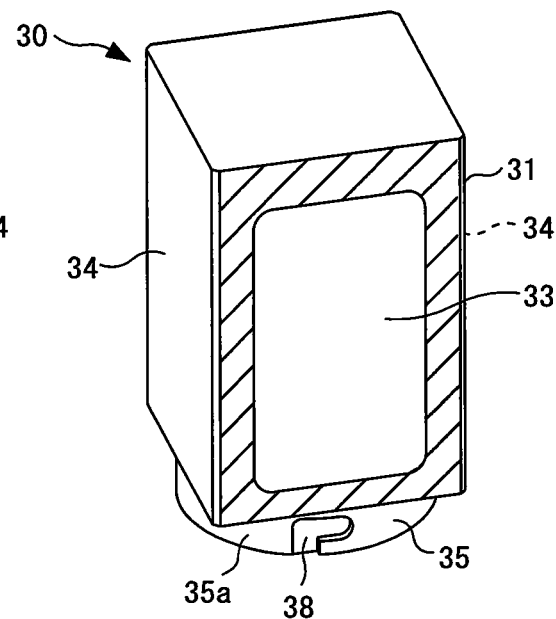
FIG. 7B is a perspective view showing a state where an X-ray transmission window of the airtight member is covered with an X-ray window material.

As shown in FIG. 7A, X-ray transmission windows 32 are formed on the side surface of the main body portion 31 by cutting out the side surface of the main body portion 31 at two opposite locations. As shown in FIG. 7B, each of these X-ray transmission windows 32 is covered with an X-ray window material 33, and keeps the inside of the hollow portion of the airtight member 30 in a hermetically sealed state. The X-ray window material 33 is attached to the periphery of the X-ray transmission window 32 (a hatched area in FIG. 7B), that is, attached to the same surface as a surface on which the X-ray transmission window 32 is formed.

It is preferable that the X-ray window material 33 is formed of a thin membrane-like material (including a sheet-like shape, a film-like shape, a foil-like shape, etc. in addition to the membrane-like shape) having a shielding performance that transmits X-rays therethrough, but does not transmit components in the atmosphere (oxygen, nitrogen, water, etc.) therethrough. By forming the X-ray window material 33 of a thin membrane-like shape, it is possible to enhance the X-ray transmission performance and irradiate the sample with X-rays having high intensity.

In the case where the X-ray window material 33 is formed to have a thin wall, there is a risk that during a manipulation work of mounting the airtight member 30 onto the base member 20, an operator accidentally touches the X-ray window material 33, and this touch damages the X-ray window material 33, so that the shielding performance against the components in the atmosphere may be significantly deteriorated.

In the present embodiment, a surface area in which the X-ray transmission windows 32 are not formed in the main body portion 31 of the airtight member 30 is broadly secured as an operating portion 34, whereby the airtight member 30 is configured so that an operator's erroneous manipulation of touching the X-ray window material 33 is unlikely to occur. In other words, as shown in FIG. 7B, in the main body portion 31 formed in the box-shaped block-like shape, the two side surfaces on which no X-ray transmission window 32 is formed function as the operating portions 34. The operator can easily, safely and surely perform the fitting operation of the airtight member 30 to the base member 20 by grasping these operating portions 34.

It is preferable that the material to be applied to the X-ray window material 33 is appropriately selected according to the properties of the sample. For example, when the sample is a substance having a highly reactive property such as an alkali metal, beryllium or aluminum is suitable as the X-ray window material 33. However, since these materials are opaque, the inside of the airtight member 30 cannot be visually observed. On the other hand, when a transparent polymer film is applied to the X-ray window material 33, the sample placed inside the airtight member 30 can be visually observed.

For example, the following materials can be used as materials suitable for the X-ray window material 33 having a gas barrier property.

As metal materials, beryllium, aluminum, etc. are suitable for the X-ray window material 33. Further, as artificial mineral, graphite, glassy carbon, diamond, SiN, quartz, sapphire, etc. are suitable for the X-ray window material 33. As polymer materials, polyethylene film (PE film), polyvinyl chloride film (PVC film), polyvinylidene chloride film (PVDC film), polyvinyl alcohol film (PVA film), polypropylene film (PP film), polycarbonate film (PC film), polystyrene film (PS film), polyacrylonitrile film (PAN film), ethylene vinyl acetate copolymer film (EVA film), ethylene-vinyl alcohol copolymer film (EVOH film), polyetherimide (PEI), aromatic polyether ketone (PEEK), etc. are suitable for the X-ray window material 33.

Note that the polymer materials basically belong to thermoplastic resins and also include fluoroplastics obtained by replacing hydrogen with fluorine. Further, multilayer processed materials by a coextrusion method, single vapor deposition or composite vapor deposition materials of aluminum, alumina, and silica, and surface-treated materials thereof are also suitable for the X-ray window material 33.

Figure 7C:
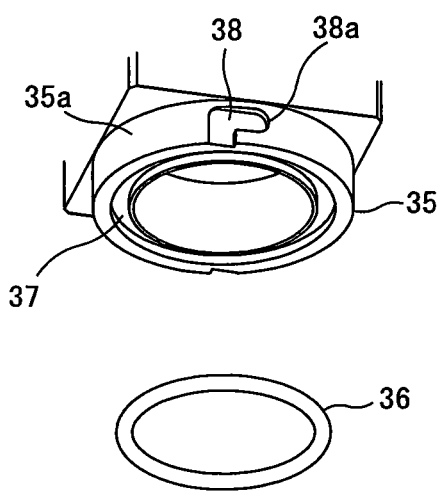
FIG. 7C is a perspective view of a fitting portion of the airtight member as seen diagonally from below.

As shown in FIG. 7C, the fitting portion 35 is formed in a tubular shape (a cylindrical shape in the present embodiment) that can be fitted into the mounting portion 21 formed in the base member 20. The outer peripheral surface 35a of the tubular fitting portion 35 is fitted to the fitting surface 22 formed on the mounting portion 21 of the base member 20.

An opening surface of the lower end of the fitting portion 35 communicates with the hollow portion inside the main body portion 31 via a hollow portion of the fitting portion 35. When the fitting portion 35 is fitted to the mounting portion 21 of the base member 20, the sample holder 10 held by the base member 20 is accommodated in the hollow portion of the main body portion 31 from the opening surface of the lower end.

A circumferential groove 37 in which an O-ring 36 is mounted is formed on the lower end edge of the fitting portion 35. The O-ring 36 mounted in the circumferential groove 37 is pressed against the bottom surface 21a of the mounting portion 21 formed in the base member 20 to keep the inside of the hollow portion of the airtight member 30 in an airtight state. By covering the surroundings of the sample holder 10 with the airtight member 30, the sample filled in the sample holder 10 can be shielded from the atmosphere.

The configuration in which the O-ring 36 is mounted on the fitting portion 35 of the airtight member 30 has the following effects as compared with a configuration in which the O-ring 36 is arranged on the side of the mounting portion 21 of the base member 20. First, even if the sample spills onto the bottom surface 21a of the mounting portion 21 when the sample holder 10 filled with the sample is mounted on the mounting portion 21 of the base member 20, there is no risk that the O-ring 36 mounted on the fitting portion 35 of the airtight member 30 is polluted. The sample which has spilled on the bottom surface 21a of the mounting portion 21 may be swept out from the cutout portions 25 before the airtight member 30 is mounted on the base member 20.

Further, a locking mechanism is provided to each fitting surface of the mounting portion 21 of the base member 20 and the fitting portion 35 of the airtight member 30 (the fitting surface 22 of the mounting portion 21 and the outer peripheral surface 35a of the fitting portion 35). This locking mechanism locks in a step in which the fitting portion 35 is fitted into the mounting portion 21, and prevents the airtight member 30 from coming off the base member 20.

In the present embodiment, the locking mechanism is configured by the lock pin 23 (see FIGS. 1 and 4A) provided on the fitting surface 22 of the mounting portion 21 of the base member 20 and an L-shaped groove 38 (see FIGS. 1 and 7C) formed on the outer peripheral surface 35a of the fitting portion 35 in the airtight member 30. The L-shaped groove 38 is opened at the lower end of the fitting portion 35, and it extends upwards in the axial direction of the fitting portion 35, bends in the circumferential direction of the fitting portion 35, and forms a termination portion 38a there.

Figure 7D:
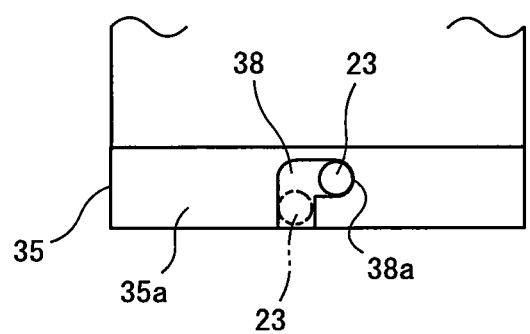
FIG. 7D is an enlarged front view showing a locking mechanism of the airtight member.

In other words, as shown in FIG. 7D, when the fitting portion 35 of the airtight member 30 is fitted into the mounting portion 21 of the base member 20, the lock pin 23 is engaged with the L-shaped groove 38, and subsequently, the fitting portion 35 is rotated about the central axis to bring the lock pin 23 into contact with the terminal portion 38a of the L-shaped groove 38. At this time, the O-ring 36 is pressed against the bottom surface 21a of the mounting portion 21 formed in the base member 20, thereby forming an airtight state.

Here, the operator can check that the airtight state has been properly formed with a sound of collision when the lock pin 23 comes into contact with the terminal portion 38a of the L-shaped groove 38. In the state where the lock pin 23 has been in contact with the terminal portion 38a of the L-shaped groove 38, the fitting portion 35 is prevented from moving in the axial direction of the fitting portion 35 with respect to the mounting portion 21 of the base member 20, and thus there is no risk that the airtight member 30 comes off the base member 20.

With this series of fitting operations, the locking mechanism according to the present embodiment constitutes an interlocking locking mechanism that can prevent the airtight member 30 from coming off the base member 20 and form an airtight state in an interlocking manner.

Figure 8:
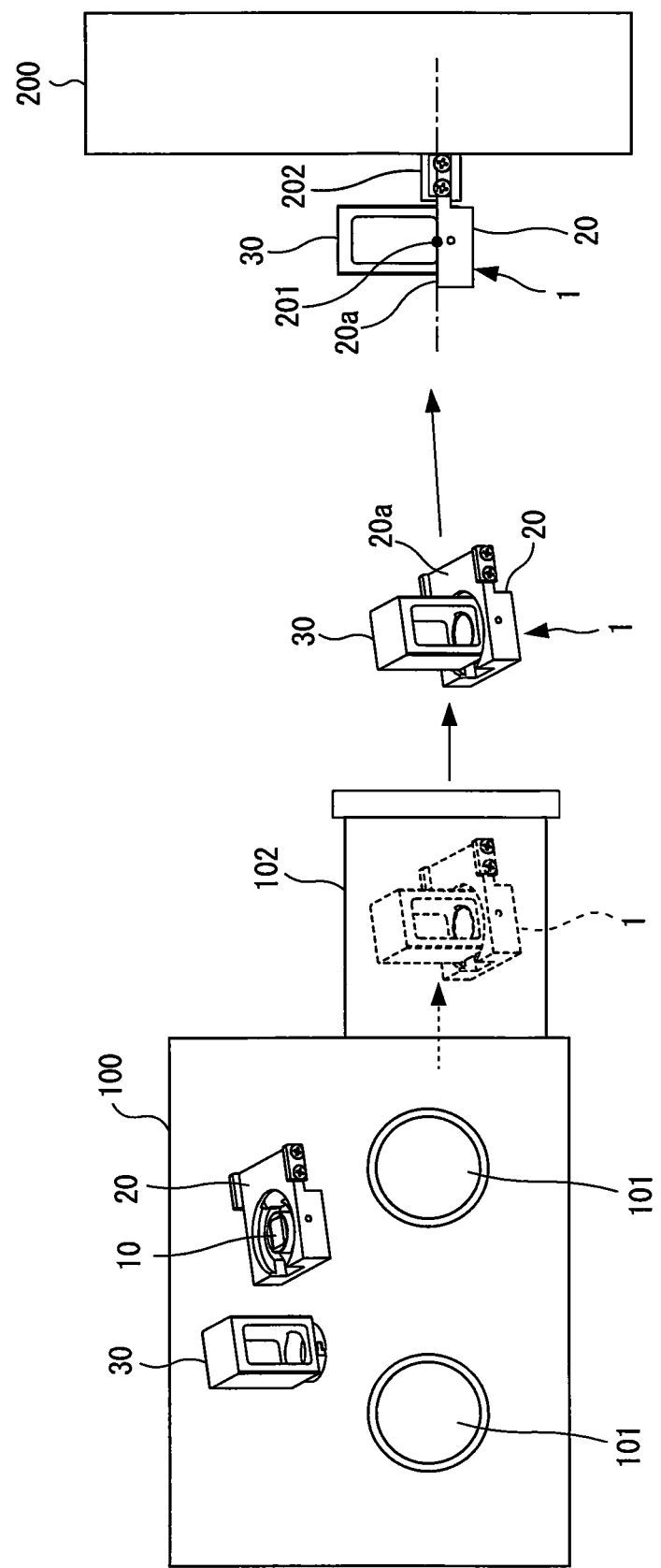
FIG. 8 is a diagram showing steps to be executed until a sample has been arranged at an X-ray irradiation position of an X-ray analysis apparatus by using the sample holding device for X-ray analysis according to the embodiment of the present invention.

FIG. 8 is a diagram showing steps until a sample is placed at an X-ray irradiation position of the X-ray analysis apparatus by using the sample holding device for X-ray analysis of the present embodiment.

A work of fitting the sample holder 10 into the base member 20 to hold the sample holder 10 can be performed outside the glove box 100.

The base member 20 holding the sample holder 10, the airtight member 30, and the sample are accommodated in the glove box 100. Thereafter, the operator wears rubber gloves 101 attached to the glove box 100, and executes the processing in the glove box 100 via the rubber gloves 101.

In the glove box 100, the sample is first filled in the recessed groove 12 of the sample holder 10, and the surface (sample surface) of the sample is rubbed and smoothed by using a spatula or the like to match the sample surface with the opening surface of the recessed groove 12.

Next, the airtight member 30 is mounted on the base member 20. At this time, the operation portions 34 of the airtight member 30 are grasped and the airtight member 30 is fitted on the base member 20. Since the operating portions 34 are secured in a wide area on the side surface of the airtight member 30, so that this operation can be easily performed.

By mounting the airtight member 30 on the base member 20, the sample is placed in the hollow portion of the airtight member 30 under the airtight state. The sample holding device 1 for X-ray analysis in which the respective members are assembled in this way is moved to an antechamber (pass box) 102 concatenated to the glove box 100, and the sample holding device 1 for X-ray analysis is taken out to the outside through the antechamber 102. Then, the sample holding device 1 for X-ray analysis is attached to the X-ray analysis apparatus 200.

Even when the sample holding device 1 for X-ray analysis is moved in the atmosphere, there is no risk that the sample chemically reacts with the components in the atmosphere because the sample is shielded from the atmosphere by the airtight member 30.

Here, when X-ray analysis is performed, it is necessary to arrange the sample surface at an X-ray irradiation position 201 set in the X-ray analysis apparatus 200. The X-ray irradiation position 201 is preset in the X-ray analysis apparatus 200. Generally, the X-ray irradiation position 201 is the center position of a goniometer equipped in the X-ray analysis apparatus 200. The goniometer is adjusted so that a slit having a narrow width of about 0.05 mm is arranged at this center position and a direct beam from the X-ray source penetrates through the slit and enters the X-ray detector, whereby the center position of the goniometer is positioned to the irradiation position of X-rays. The X-ray analysis apparatus 200 is provided with a sample support portion 202 for inserting and supporting a general-purpose sample holder at the center position of the goniometer.

The sample holding device for X-ray analysis of the present embodiment is configured such that the base member 20 is inserted and mounted in the sample support portion 202 of the X-ray analysis apparatus 200. When the base member 20 is inserted into the sample support portion 202, the sample support portion 202 is adjusted in advance so that the upper surface 20a (see FIG. 2) of the base member 20 is arranged to be located at the same height position as the X-ray irradiation position 201 simultaneously with the insertion of the base member 20.

When the fitting convex portion 13 of the sample holder 10 is fitted and held in the holding groove 24 of the base member 20, the opening surface of the recessed groove 12 forming the sample filling portion is positioned to be flush with the upper surface 20a of the base member 20. As described above, the surface (sample surface) of the sample filled in the recessed groove 12 is rubbed and smoothed by using a spatula or the like, and is aligned with the opening surface of the recessed groove 12. As a result, the sample surface is arranged to be flush with the upper surface 20a of the base member 20.

As described above, when the base member 20 is fixed in the X-ray analysis apparatus 200, the upper surface 20a of the base member 20 is positioned at the same height position as the X-ray irradiation position 201 of the X-ray analysis apparatus 200, and at the same time, the sample surface is also placed at the same height position as the X-ray irradiation position 201, which makes it easy to position (particularly, position in the height direction) the sample surface with respect to the X-ray irradiation position 201.

Figure 9:
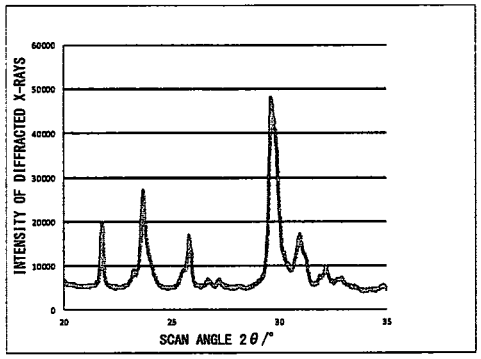
FIG. 9 is a graph showing an experimental result of testing the airtight holding ability of the sample holding device for X-ray analysis according to the embodiment of the present invention.
Figure 9:
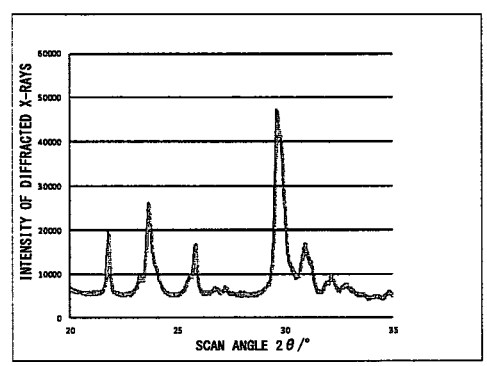
Figure 9:
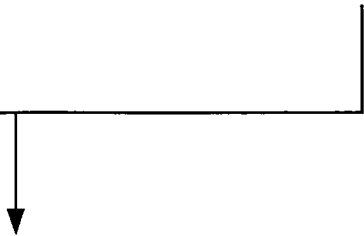
Figure 9:
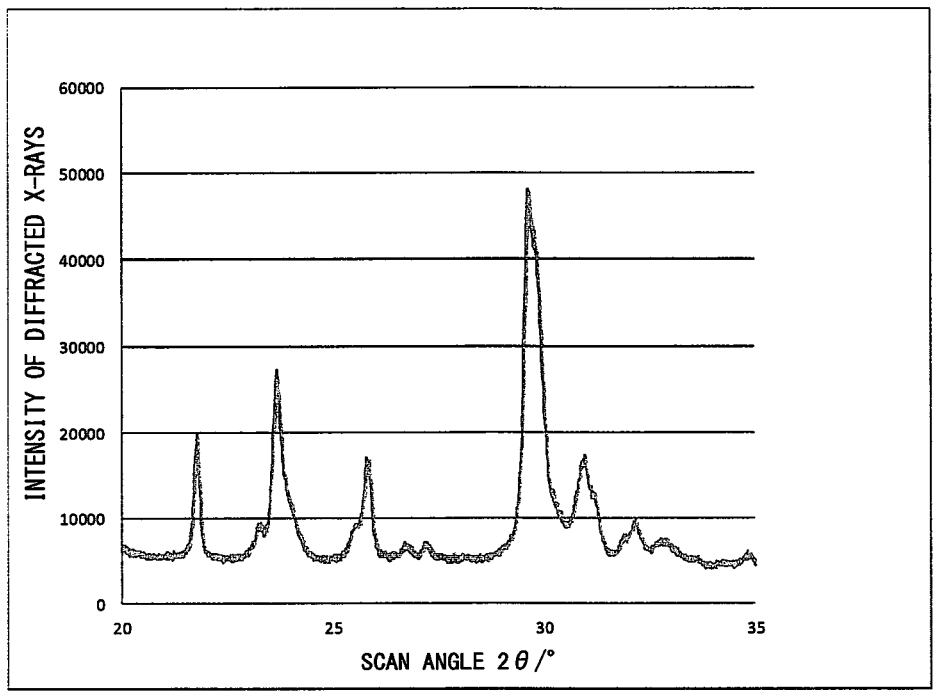

FIG. 9 is a graph showing an experimental result obtained by testing the airtight holding ability of the sample holding device for X-ray analysis according to this embodiment.

$Li_7P_3S_{11}$ (sulfide glass-based electrolyte) that easily hydrolyzes in the atmosphere was used as a sample, the same sample was mounted in a glove box under an argon gas atmosphere, and the surroundings of the sample were kept airtight by the airtight member 30. Thereafter, the sample holding device for X-ray analysis was taken out from the glove box, and left in the air conditioned at 23° C. for one day. Data A obtained by performing X-ray diffraction measurement on the sample immediately after the sample holding device for X-ray analysis was taken out from the glove box was compared with data B obtained by performing X-ray diffraction measurement on the sample after the sample holding device for X-ray analysis was left for one day, and substantially the same X-ray profile (detection result) was obtained from the data A and the data B. When atmospheric components and moisture enter the inside of the airtight member 30, they react with the sample, and decrease in the peak intensity of the X-ray profile appears. However, such a change is not recognized from the above comparison result, and it can be seen that the surroundings of the sample are kept airtight.

Note that the present invention is not limited to the above-described embodiment, and it is needless to say that various modifications and applications can be carried out as necessary.

For example, in the above-described embodiment, the mounting portion 21 for mounting the airtight member 30 is configured by a part of the stepped concave portion. However, the mounting portion 21 may include a convex portion or a ridge portion, and configured so that the inner peripheral surface or the outer peripheral surface of the fitting portion 35 of the tubular airtight member 30 is fitted to the outer peripheral surface or inner peripheral surface of the convex portion or the ridge portion.

Further, the airtight member 30 is not limited to the box-shaped block type as shown in the above-described embodiment, and may be configured in various three-dimensional shapes that can secure the operating portion 34 in a wide area.

Figure 10A:
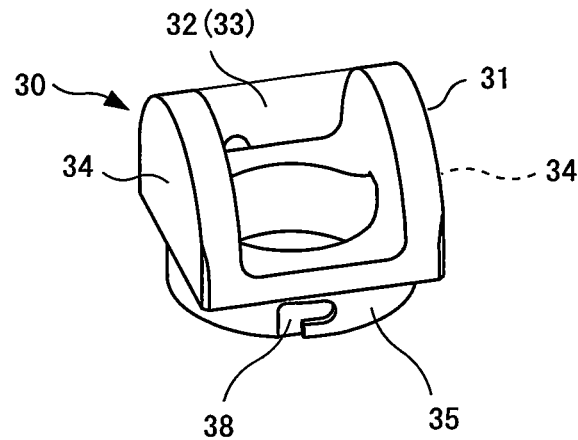
FIG. 10A is a perspective view showing an airtight member in a sample holding device for X-ray analysis according to another embodiment of the present invention.
Figure 10B:
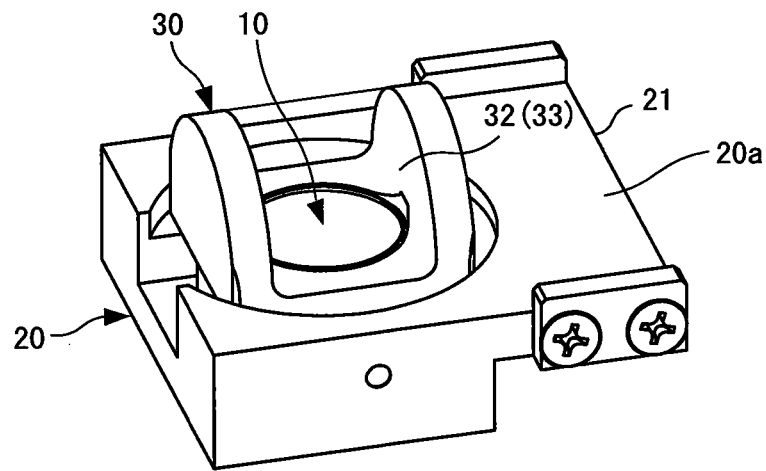
FIG. 10B is a perspective view of the sample holding device for X-ray analysis.

For example, as shown in FIGS. 10A and 10B, the airtight member 30 can be formed in an arched block type. The main body portion 31 of the airtight member 30 has an X-ray transmission window 32 which is formed in an arched plane shape, and an X-ray window material 33 is attached to an edge portion of the periphery of the X-ray transmission window 32 so as to cover the X-ray transmission window 32.

The fitting portion 35 of the airtight member 30 is configured similarly to the previously-described embodiment shown in FIGS. 7C and 7D.

Figure 10C:
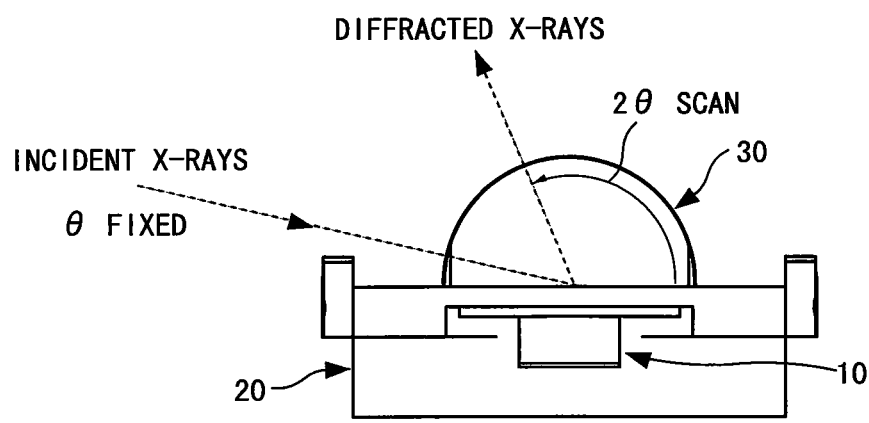
FIG. 10C is a left side view of the sample holding device for X-ray analysis.

For example, as shown in FIG. 10C, in the X-ray diffraction measurement (thin film measurement method) in which X-ray scanning (2θ scan) is performed while the incident angle is fixed to a low angle, use of the box-shaped block type airtight member 30 described above causes a risk that when an attempt is made to measure a high angle 2θ, diffracted rays from the sample may interfere with the edge portion (window frame portion) of the X-ray transmission window 32 of the main body portion 31, so that the X-ray detector cannot detect the diffracted rays. On the other hand, with respect to the airtight member 30 formed in the arched block-like shape, the main body portion 31 does not block diffracted rays from the sample, and it is possible to perform measurement up to a high angle region.

Figure 11A:
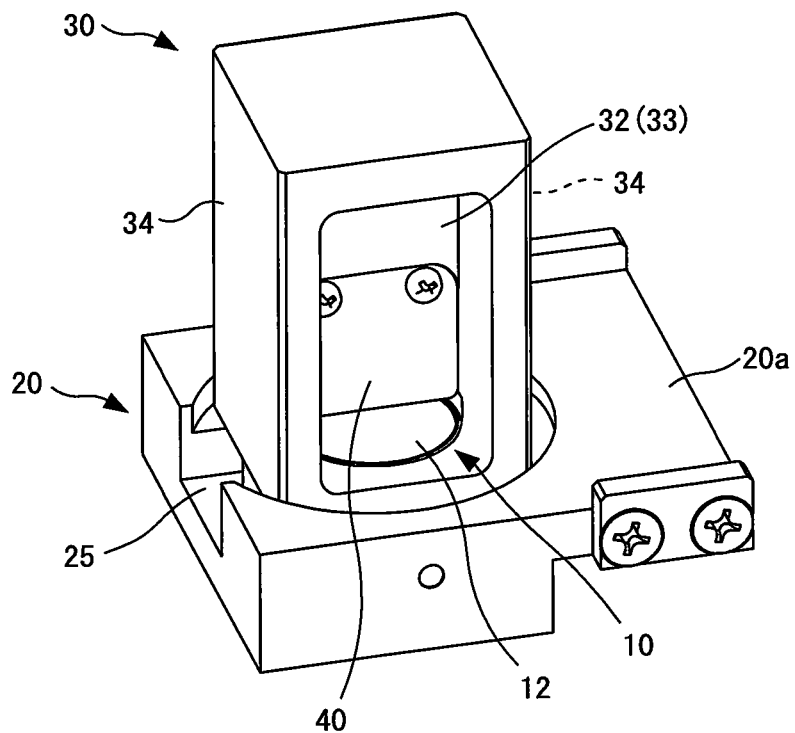
FIG. 11A is a perspective view showing a sample holding device for X-ray analysis according to another embodiment of the present invention.
Figure 11B:
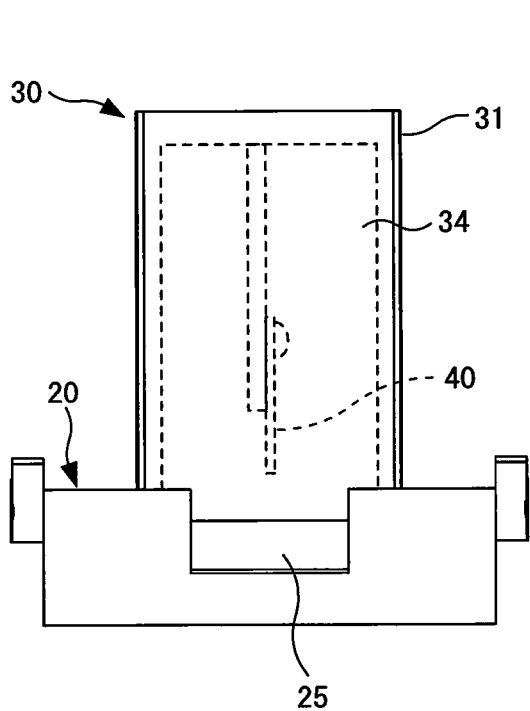
FIG. 11B is a left side view of the sample holding device for X-ray analysis.
Figure 11C:
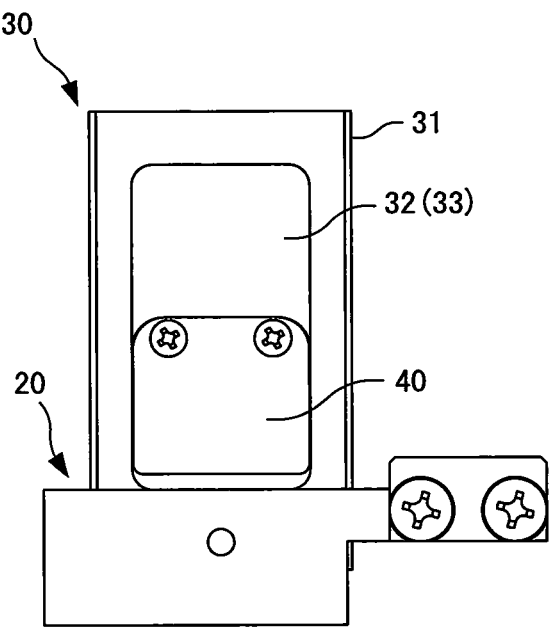
FIG. 11C is a front view of the sample holding device for X-ray analysis.

Further, as shown in FIGS. 11A to 11C, a knife edge 40 may be provided in the hollow portion of the airtight member 30 so as to hang downward from the ceiling surface. The knife edge 40 is a plate-shaped member formed of a material that shields X-rays, and is arranged so that an appropriate gap is formed between the substantially center portion of the sample surface and the lower end edge of the knife edge 40. The front surface of the knife edge 40 is arranged to face the optical axis of incident X-rays, the X-rays penetrate through the gap between the sample surface and the knife edge 40 to irradiate the sample surface, and further the diffracted X-rays are reflected to the back side of the knife edge 40.

When the incident X-rays penetrate through the X-ray window material 33, scattered X-rays may be generated. Since the scattered X-rays are shielded by the knife edge 40, it is possible to reduce noise in X-ray measurement data caused by the scattered X-rays and implement highly accurate measurement analysis.

Figure 12:
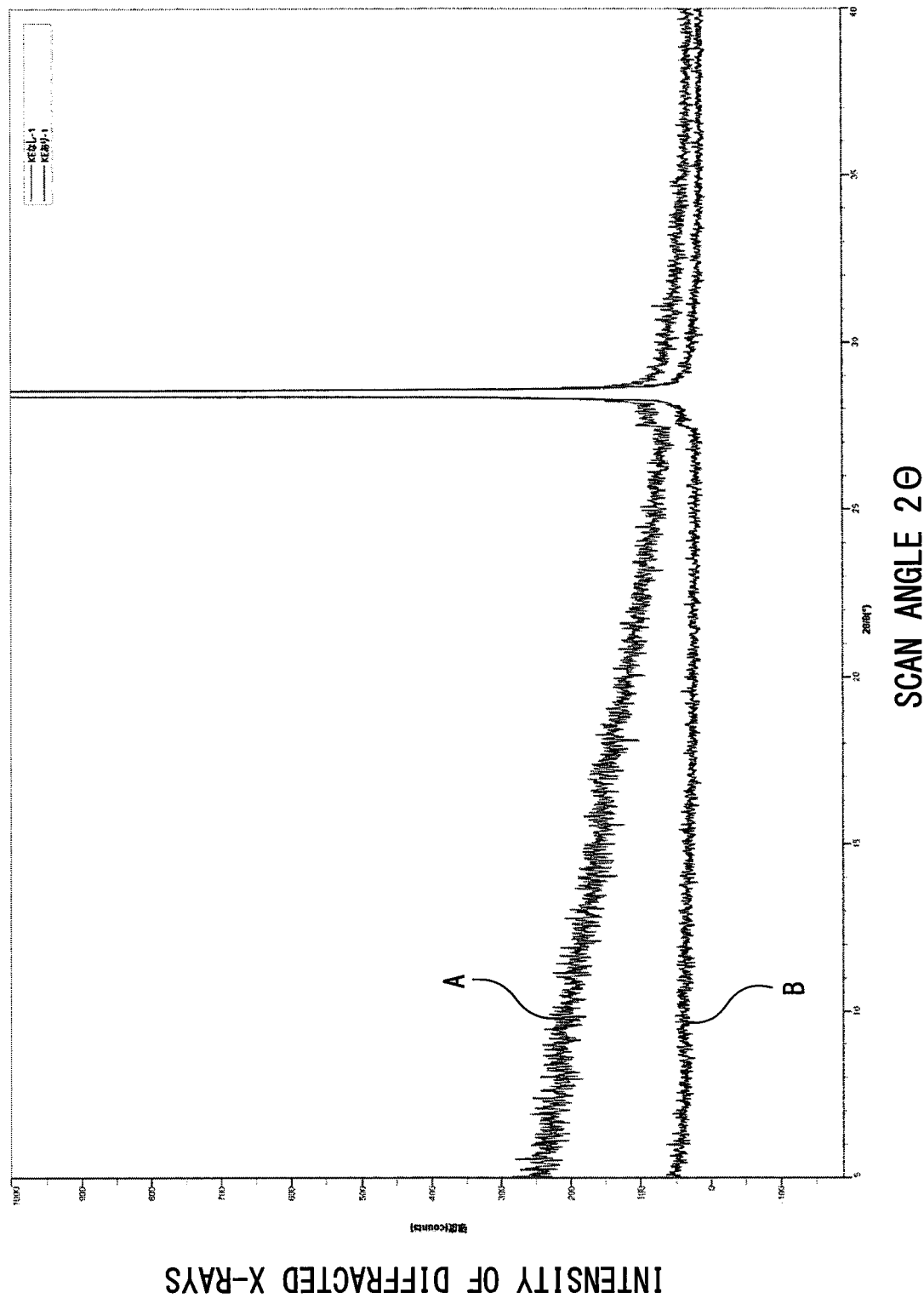
FIG. 12 is a diagram showing an experimental example for verifying an effect of a knife edge.

FIG. 12 is a diagram showing an experimental example for verifying an effect of the knife edge 40.

Measurement data A shown in FIG. 12 is measurement data obtained by performing X-ray diffraction measurement using the sample holding device for X-ray analysis which has the structure shown in FIG. 2, but is not provided with the knife edge 40. On the other hand, measurement data B is measurement data obtained by performing X-ray diffraction measurement using the sample holding device for X-ray analysis which has the structure shown in FIG. 11A and is provided with the knife edge 40. Each sample holding device for X-ray analysis has the same dimension and structure except for the knife edge 40.

As is clear from the comparison between these measurement data A and B, noise caused by scattered X-rays is superimposed on the measurement data A in an angle region other than a scan angle where the peak intensity of the diffracted X-rays appears, and therefore, especially the diffracted X-ray intensity measured in a low angle region shows a larger value as compared with the measurement data B.

The invention claimed is:

1. A sample holding device for X-ray analysis comprising:
a sample holder having a sample filling portion for filling a sample;
a base member for holding the sample holder; and
an airtight member configured to be freely detachably mounted on the base member, wherein the base member has a mounting portion for mounting the airtight member thereon, the airtight member has a fitting portion configured to be fitted and mounted in the mounting portion, a locking mechanism is provided to the mounting portion and the fitting portion so as to prevent the airtight member from coming off the base member through engagement in a step of fitting the fitting portion into the mounting portion, the airtight member includes a main body portion having a hollow portion therein, and the fitting portion formed so as to protrude from a lower surface of the main body portion, a lower end surface of the fitting portion is opened and communicates with the hollow portion in the main body portion, an X-ray transmission window is formed by cutting out the main body portion, and an X-ray window material is formed around the X-ray transmission window so as to cover the X-ray transmission window, and an operating portion for enabling an operator to perform a fitting operation while gripping the operating portion is formed in a surface region of the main body portion where the X-ray transmission window is not formed.

2. The sample holding device for X-ray analysis according to claim 1, wherein the X-ray window material is formed of any one of metal, artificial mineral and polymer.

3. The sample holding device for X-ray analysis according to claim 1, wherein the base member includes a holding groove configured to freely detachably hold the sample holder, and the sample holder includes a fitting convex portion configured to be fitted and held in the holding groove, wherein the sample filling portion of the sample holder is formed by a recessed groove, and an opening surface of the recessed groove is formed in a rectangular shape, and wherein the sample holding device for X-ray analysis further comprises a configuration in which a long side or short side of a rectangular shape on the opening surface of the recessed groove is arranged in a direction perpendicular to an optical axis of incident X-rays by changing an orientation of the fitting convex portion of the sample holder around a central axis by 90° with respect to the holding groove of the base member and fitting the fitting convex portion into the holding groove of the base member.

4. The sample holding device for X-ray analysis according to claim 3, wherein an upper surface of the base member is arranged at the same height position as an X-ray irradiation position in an X-ray analysis apparatus when the sample holding device for X-ray analysis is mounted in the X-ray analysis apparatus, and an opening surface of the recessed groove is positioned so as to be flush with an upper surface of the base member when the sample holder is held in the base member.

5. The sample holding device for X-ray analysis according to claim 1, wherein the airtight member is provided with a knife edge in the hollow portion of the main body portion, the knife edge hanging downward from a ceiling surface and shielding scattered X-rays incident through the X-ray transmission window.

6. The sample holding device for X-ray analysis according to claim 1, wherein the mounting portion of the base member is formed by a concave portion or a convex portion, the fitting portion of the airtight member is formed in a tubular shape that allows the fitting portion to be fitted into the mounting portion, and the locking mechanism is provided to each fitting surface of the mounting portion and the fitting portion.

* * * * *